(12) United States Patent
Krishnaswamy et al.

(10) Patent No.: US 7,720,061 B1
(45) Date of Patent: May 18, 2010

(54) DISTRIBUTED SOLUTION FOR MANAGING PERIODIC COMMUNICATIONS IN A MULTI-CHASSIS ROUTING SYSTEM

(75) Inventors: Umesh Krishnaswamy, San Jose, CA (US); Nitin Bahadur, Santa Clara, CA (US); Rahul Aggarwal, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 504 days.

(21) Appl. No.: 11/506,426

(22) Filed: Aug. 18, 2006

(51) Int. Cl.
*H04L 12/28* (2006.01)
*H04L 12/56* (2006.01)

(52) U.S. Cl. .................. 370/389; 370/392; 370/400; 370/419

(58) Field of Classification Search .......... 370/392, 370/389, 400
See application file for complete search history.

(56) References Cited

U.S. PATENT DOCUMENTS

| | | | |
|---|---|---|---|
| 2002/0141343 | A1 | 10/2002 | Bays |
| 2003/0123457 | A1* | 7/2003 | Koppol .................. 370/400 |
| 2005/0013310 | A1 | 1/2005 | Banker et al. |
| 2005/0259571 | A1 | 11/2005 | Battou |
| 2008/0034120 | A1* | 2/2008 | Oyadomari et al. ......... 709/248 |

OTHER PUBLICATIONS

Cisco IOS in a Nutshell, 2nd Edition, published on Aug. 2005, by James Boney.*

U.S. Appl. No. 10/457,828, filed Jun. 9, 2003, entitled, "Managing Periodic Communications," to David M. Katz et al.

* cited by examiner

*Primary Examiner*—Daniel J Ryman
*Assistant Examiner*—Nishant B Divecha
(74) *Attorney, Agent, or Firm*—Shumaker & Sieffert, P.A.

(57) ABSTRACT

Techniques are described for configuration of a multi-chassis router for managing periodic communications between the multi-chassis router and other network devices. The multi-chassis router selectively processes data received from a network by determine whether the data: (1) indicates an operational state of a network device in association with a routing protocol, or (2) conveys routing information for the routing protocol. Data conveying routing information are processed by a master routing component of the multi-chassis router, while data indicating an operational state of a network device are processed by one or more slave routing components of the multi-chassis router. The techniques also allow the multi-chassis router to allocate responsibility for managing periodic communications for the set of routing protocols among a plurality of hierarchically arranged cooperative routing components within the multi-chassis router, such as switch card chassis, line card chassis, or interface cards within each line card chassis.

18 Claims, 11 Drawing Sheets

| IDENTIFIER | PROTOCOL | PERIOD | TIMER | OTHER PARAMETERS |
|---|---|---|---|---|
| 114.25.1.38 | BFD | 10 SEC | 15 SEC | ... |
| 145.25.3.154 | OSPF | 12 SEC | 15 SEC | ... |
| 93.51.16.253 | BFD | 10 SEC | 15 SEC | ... |
| ⋮ | ⋮ | ⋮ | ⋮ | ⋮ |
| ... | ... | ... | ... | ... |

DISTRIBUTED SOLUTION FOR MANAGING PERIODIC COMMUNICATIONS IN A MULTI-CHASSIS ROUTING SYSTEM

TECHNICAL FIELD

The invention relates to computer networks and, more particularly, to systems for routing packets within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table. A router uses interface cards (IFCs) for receiving and sending data packets via network links. These IFCs are installed in ports known as interfaces and are configured using interface configurations.

One way to meet increasing bandwidth needs is to use multi-chassis routers. A multi-chassis-router is a router in which multiple routing nodes are physically coupled and configured to operate as a single routing node. One example of a multi-chassis router includes multiple line card chassis (LCCs), which include one or more IFCs for sending and receiving packets, and a central switch card chassis (SCC), which provides top-down management of the LCCs. This type of multi-chassis router is often referred to as a single-headed multi-chassis router, i.e., a routing system in which all routing computations are done on a single routing engine that is designated as the master of the routing system. To peer routers on the network, the multi-chassis router appears as a single routing node. Because multi-chassis routers combine resources of multiple routing devices, multi-chassis routers have much higher bandwidth capabilities than standalone routers. For example, the use of multi-chassis routers can simplify and improve routing on a service provider network by consolidating routing functions onto fewer routers.

In order to maintain an accurate representation of a network, routers typically send periodic packets to each other to communicate the state of the device. These periodic packets are sometimes referred to as "keepalives" or "hellos." For example, a first router may send a packet to a second router every five seconds to verify that the router is still operational. The first router may require the second router to respond in a certain amount of time. When a response packet is not received in the allotted time frame, the first router expecting the message may conclude a failure has occurred, such as failure of the second router or failure of the link connecting the two routers. Consequently, the first router may update its routing information to exclude that particular link, and may issue a number of update messages to neighboring routers indicating the link failure.

However, a number of non-failure conditions may prevent the second router from responding to the first router within the required periodic response time. For example, the computing resources of the second router may be consumed due to heavy network traffic loads. In other words, with the increased amount of network traffic on the Internet, for example, many conventional routers have become so busy performing other functions, such as route resolution, that the response time to periodic packets is not sufficient. Furthermore, the increased complexity of current routers has increased the number of processes concurrently executing on the router, each of which require computing resources. In addition, there has been continual demand to shorten the allowable time to respond to such periodic messages in order to accelerate the detection of failure conditions.

SUMMARY

In general, techniques are described for configuration of a multi-chassis router for managing periodic communications between the multi-chassis router and other network devices, such as peer or neighboring routers. For example, a multi-chassis router may include a central switch card chassis (SCC) having a master routing engine and one or more line card chassis (LCCs), each having one or more local routing engines.

The techniques allow the multi-chassis router to selectively process control plane communications by differentiating between (1) control plane communications that are periodic messages indicating operational states of peer network devices, and (2) control plane communications that convey routing information and potentially influence routing decisions. Control plane communications conveying routing information (i.e., network topology information) are processed by a routing protocol daemon on a master routing engine of the SCC, while control plane communications associated with periodic messages that merely indicate an operational state of a network device are processed by one or more dedicated periodic packet management software agents executing within the lower-level LCCs and line cards (LCs) within the LCCs. The techniques also allow the multi-chassis router to intelligently allocate responsibility for managing periodic communications for the set of routing protocols among a plurality of hierarchically arranged cooperative routing components within the multi-chassis router.

In one embodiment, a method comprises performing network routing operations for a set of routing protocols with a multi-chassis router having a plurality of hierarchically arranged routing components operating as a single node within a network, and allocating responsibility for performing periodic communications for the set of routing protocols to the plurality of hierarchically arranged routing components, wherein the periodic communications indicate an operational state of a network device. The method further comprises communicating with neighboring devices using periodic communication messages with the hierarchically arranged routing components.

In another embodiment, a router comprises a plurality of hierarchically arranged cooperative routing components operating as a single node within a network, and a set of routing protocols executing within operating environments provided by a master one of the routing components, wherein the routing protocols exchange routing information with neighboring routers and update routing data based on the exchanged routing information. The router further comprises a set of one or more periodic packet management daemons that communicate with peer routers using periodic communications to exchange operational state of the routers, wherein the set of one or more periodic packet management daemons is distributed among the hierarchically arranged cooperative routing components.

In another embodiment, a computer-readable medium comprises instructions for causing a programmable processor to perform network routing operations for a set of routing protocols with a multi-chassis router having a plurality of hierarchically arranged routing components operating as a single node within a network, and allocate responsibility for performing periodic communications for the set of routing protocols to the plurality of hierarchically arranged cooperative routing components, wherein the periodic communications indicate an operational state of a network device. The computer-readable medium further comprises instructions causing the programmable processor to communicate with neighboring devices using periodic communication messages with the hierarchically arranged routing components.

The invention may provide one or more advantages. For example, the techniques may increase the number of simultaneous periodic communication sessions a router may perform, and reduce the loading on the SCC by offloading periodic packet management to the LCCs. As a result, the techniques may provide for a more scalable routing architecture. The techniques may further prevent a router from thrashing, i.e., spending much or all of its computing resources on simply responding to peers, a problem which can lead to significant network delays. Moreover, distributing the responsibility of responding to periodic messages to the LCCs may increase the multi-chassis router's ability to respond to peers within required time periods even under heavy loads, thereby potentially reducing update packets sent over the network in response to non-failure conditions.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 6 is a block diagram illustrating an exemplary session information data structure maintained by a periodic packet management daemon of a switch card chassis.

DETAILED DESCRIPTION

Figure 1:
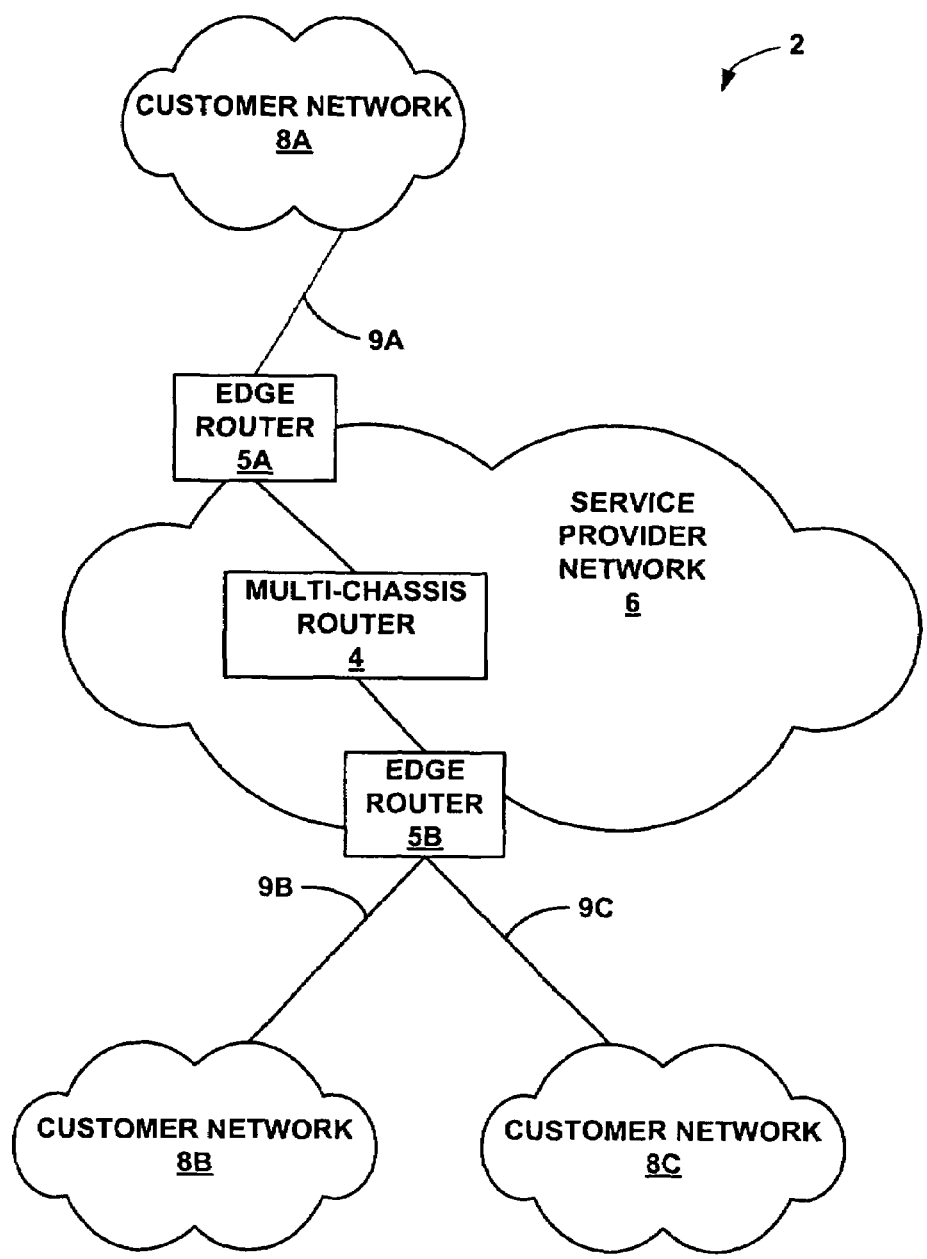
FIG. 1 is block diagram of an example computing environment in which a service-provider network includes a multi-chassis router.

FIG. 1 is a block diagram illustrating an example computing environment 2 in which service provider network 6 includes a multi-chassis router 4. For purposes of example, the principles of the invention are described with respect to the computing environment 2 of FIG. 1 in which multi-chassis router 4 communicates with edge routers 5A and 5B ("edge routers 5") to provide customer networks 8A-8C ("customer networks 8") with access to network 6. Multi-chassis router 4 may send periodic data, such as packets, to edge routers 5 in order to maintain an accurate representation of the topology of network 10. Multi-chassis router 4 may consist of a plurality of hierarchically arranged cooperative routing components operating as a single node within service provider network 6. In one embodiment, multi-chassis router 4 includes a switch card chassis (SCC) that operates as a control node and one or more line card chassis (LCCs) that operate as packet routing devices. The LCCs may contain all the physical interfaces for coupling to other devices within network 6, while the SCC controls and routes traffic between the LCCs.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. Service provider network 6 may include a variety of network devices other than multi-chassis router 4 and edge routers 5, such as additional routers, switches, servers, or other devices.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, or other devices. The configuration of computing environment 2 illustrated in FIG. 1 is merely exemplary. For example, service provider network 6 may be coupled to any number of customer networks 8. Nonetheless, for ease of description, only customer networks 8A-8C are illustrated in FIG. 1.

Consistent with the principles of the inventions, multi-chassis router 4 sends periodic data packets to edge routers 5 in order to maintain an accurate representation of the topology of service provider network 6. For example, multi-chassis router 4 may exchange periodic communications using one or more routing protocols, such as Bidirectional Flow Detection (BFD), Open Shortest Path First (OSPF), or Intermediate System-to-Intermediate System (ISIS). Multi-chassis router 4 may further use periodic communication when using Media Access Control (MAC) layer protocols such as Frame Relay LMI, point-to-point protocol (PPP) and the like. As an example, multi-chassis router 4 may send a respective "keepalive" packet every three seconds to both edge routers 5A and 5B to indicate that multi-chassis router 4 is in an "active" state. The periodic response time to a periodic packet is typically dependent on the protocol being used between multi-chassis router 4 and edge routers 5.

In the event multi-chassis router 4 does not receive a periodic packet from edge router 5A within a periodic interval, e.g., three seconds, multi-chassis router 4 may assume that edge router 5A has failed. The failure of edge router 5A may be due to an actual network event, such as the failure of a link. However, the failure of edge router 5A to respond may be caused by non-failure conditions, such as lack of computing resources of edge router 5A. Upon failure to receive a periodic packet from edge router 5A, multi-chassis router 4 may perform route resolution by invoking a path selection algorithm for each known destination affected by the network event until new paths for each known destination are selected. Furthermore, multi-chassis router 4 may broadcast update messages informing edge router 5B to withdraw the routes that make use of edge router 5A.

Multi-chassis router 4 manages the time critical periodic messages with a periodic packet management (PPM) daemon executing within multi-chassis router 4 (not shown). A routing protocol daemon, also executing within multi-chassis router 4, performs routing operations. Client routing protocols (not shown) executing within multi-chassis router 4 configure the parameters of the PPM daemon. In general, the periodic management daemon manages inbound and outbound periodic communication sessions on behalf of the clients, while the client routing protocols interact with the routing protocol daemon implements the complex routing protocols and other functions. Moreover, instances of the PPM daemon may execute on the SCC and on each of the LCCs of multi-chassis router 4, thereby distributing the task of initiating and responding to periodic messages for indicating operation state between multi-chassis router 4 and peer devices, e.g., edge routers 5. In some embodiments, multi-chassis router 4 may even push the periodic packet management functionality down to operational environments provided by line cards (LCs) of one or more LCCs.

As described in further detail below, a master PPM daemon executing within the routing engine of multi-chassis router 4 manages data structures and informs clients of any change to the topology of service provider network 6. Client software processes of the PPM daemon may comprise software protocols executing within components of multi-chassis router 4, such as Bidirectional Flow Detection (BFD) protocol, Open Shortest Path First (OSPF) protocol, Intermediate System-to-Intermediate System (IS-IS) protocol, Label Distribution Protocol (LDP), Border Gateway Protocol (BGP), or other protocols running on multi-chassis router 4. In one embodiment, the PPM daemon executing within the SCC of multi-chassis router acts primarily to allocate periodic packet management of client sessions to distributed PPM daemons running on LCCs and/or LCs within LCCs of multi-chassis router 4.

Figure 2:
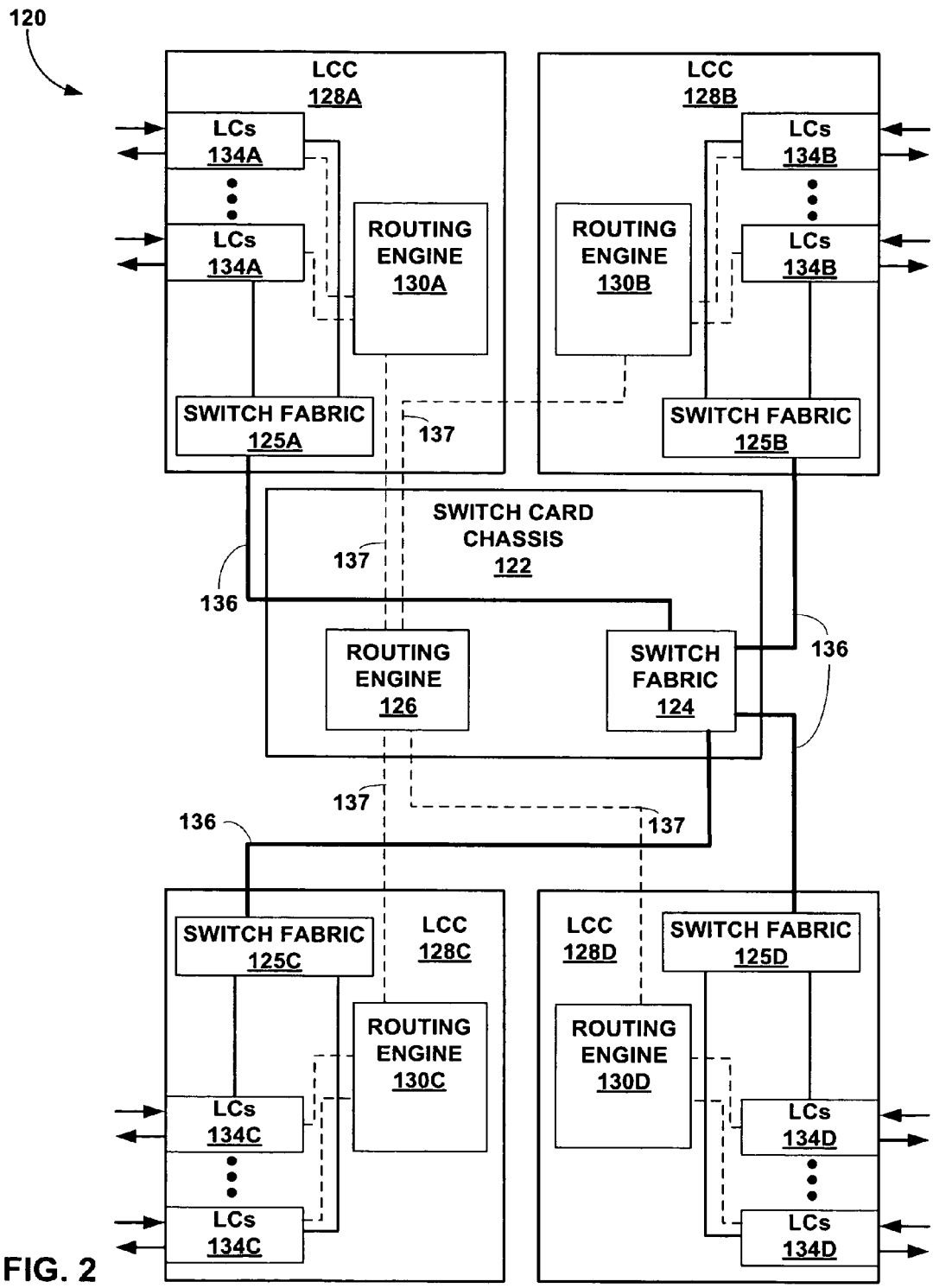
FIG. 2 is a block diagram illustrating an exemplary multi-chassis router consistent with the principles of the invention.

FIG. 2 is a block diagram illustrating an exemplary multi-chassis router 120 that operates consistent with the principles of the invention. Multi-chassis router 120 routes data packets between network devices across a network. As shown in FIG. 2, multi-chassis router includes a plurality of hierarchically arranged cooperative routing components operating as a single node within the network. In this example, multi-chassis router 120 comprises four substantially identical LCCs 128A-128D ("LCCs 128") and an SCC 122 that operates as a central control node. In other embodiments, a multi-chassis router may include more or fewer LCCs, and may or may not include a central routing node SCC 122. SCC 122 provides centralized switching and control for multi-chassis router 120. LCCs 128 provide interfaces to a network using LC sets 134A-134D ("LCs 134"), each of which have sets of individual interface cards (IFCs) (not shown) for inbound and outbound network communication.

SCC 122 includes switch fabric 124 and master routing engine 126. Switch fabric 124 provides a back-side connection, i.e. a connection separate from the network, between switch fabrics 125A-125D ("switch fabrics 125") of LCCs 128. Master routing engine 126 maintains routing information to describe a topology of a network. For example, the routing information may include route data that describes various routes through the network, and also next hop data indicating appropriate neighboring devices within the network for each of the routes. Master routing engine 126 periodically updates the routing information to accurately reflect the current network topology. Master routing engine 126 also uses the routing information to derive forwarding information bases (FIBs).

Master routing engine 126 controls packet forwarding throughout multi-chassis router 120 by installing a FIB (not shown) in LCCs 128 via communication with local routing engines 130 and/or 131 over cables 137. A FIB for one of LCCs 128 may be the same or different than a FIB for other LCCs 128 and SCC 122. Because cables 137 provide a dedicated connection, i.e., separate from a data packet forwarding connection provided by cables 136, between SCC 122 and LCCs 128, FIBs in LCC routing engines 130 can be updated without interrupting packet forwarding performance of multi-chassis router 120. LCCs 128 each contain one of local routing engines 130A-130D ("routing engines 130"), and one of switch fabrics switch fabric 125. LCs 134 may each contain at least one packet forwarding engine (PFE), (not shown), and one or more sets of IFCs (not shown).

Multi-chassis router 120 performs routing functions in the following manner. An incoming data packet is first received from a network by one of the IFCs of an LC 134, 134B, which directs it to its PFEs. The PFE then determines a next hop for the data packet using the FIB provided by the local routing engine, e.g., routing engine 130B. If the data packet is destined for an outbound link associated with the IFC that initially received the packet, the PFE forwards the packet to the outbound link. In this manner, packets may be sent out by the same PFE on which they were received from the network bypass switch fabric 124 and switch fabric 125.

Otherwise, the PFE sends the data packet to switch fabric 125, where it is directed to switch fabric 124 and ultimately is communicated to one of the other PFEs. The receiving PFE outputs the data packet to the appropriate next hop via one of the IFCs on LC 134. Thus, an incoming data packet received by one of LCCs 128 may be sent by another one of LCCs 128 to a next hop along a route to the packets ultimate destination. Other multi-chassis routers that operate in a manner consistent with the principles of the invention may use different switching and routing mechanisms.

As described with respect to multi-chassis router 4 in FIG. 1, in some embodiments, multi-chassis router 120 may communicate with peer routing devices using periodic messages in order to maintain connectivity with those devices. For example, a packet management (PPM) daemon of multi-chassis router 120 may generate a periodic packet and send the packet to neighboring devices at a periodic interval, say once every three seconds, to indicate that multi-chassis router 120 is still operational. Moreover, multi-chassis router 120 may output periodic messages in accordance with different formats and to different peers depending on the routing protocols supported by the router. Multi-chassis router 120 may then wait for a response from each of the neighboring network devices to confirm their operational state. As described herein, SCC 122 may distribute the management of these protocol-related, periodic communications across LCCs 128 and across various components of the LCCs 128 including LCs 134.

In some instances, multi-chassis router 120 may receive a response periodic packet at one of LCCs 128, in particular, at one of LCs 134, yet the response periodic packet must be directed to a different one of LCCs that originated communication with the peer. For example, an IFC of an LC 134A may send a periodic packet according to a routing protocol to a peer router, but an IFC of an LC 134D may receive the corresponding response periodic packet. Continuing this example, as described in further detail below, LC 134D determines whether the packet corresponds to a "network adjacency" to which LC 134D has been given responsibility. Based on this determination, LC 134D either processes the periodic message, or forwards the packet within multi-chassis router to ensure the response message is processed by the correct LCC.

Multi-chassis router 120 and, in particular, SCC 122 and LCCs 128 include hardware, firmware and or software, and may include processors, control units, discrete hardware circuitry, or other logic for executing instructions fetched from computer-readable media. Examples of such media include hard disks, Flash memory, random access memory (RAM), read-only memory (ROM), non-volatile random access memory (NVRAM), electrically erasable programmable read-only memory (EEPROM), flash memory, and the like.

Figure 3:
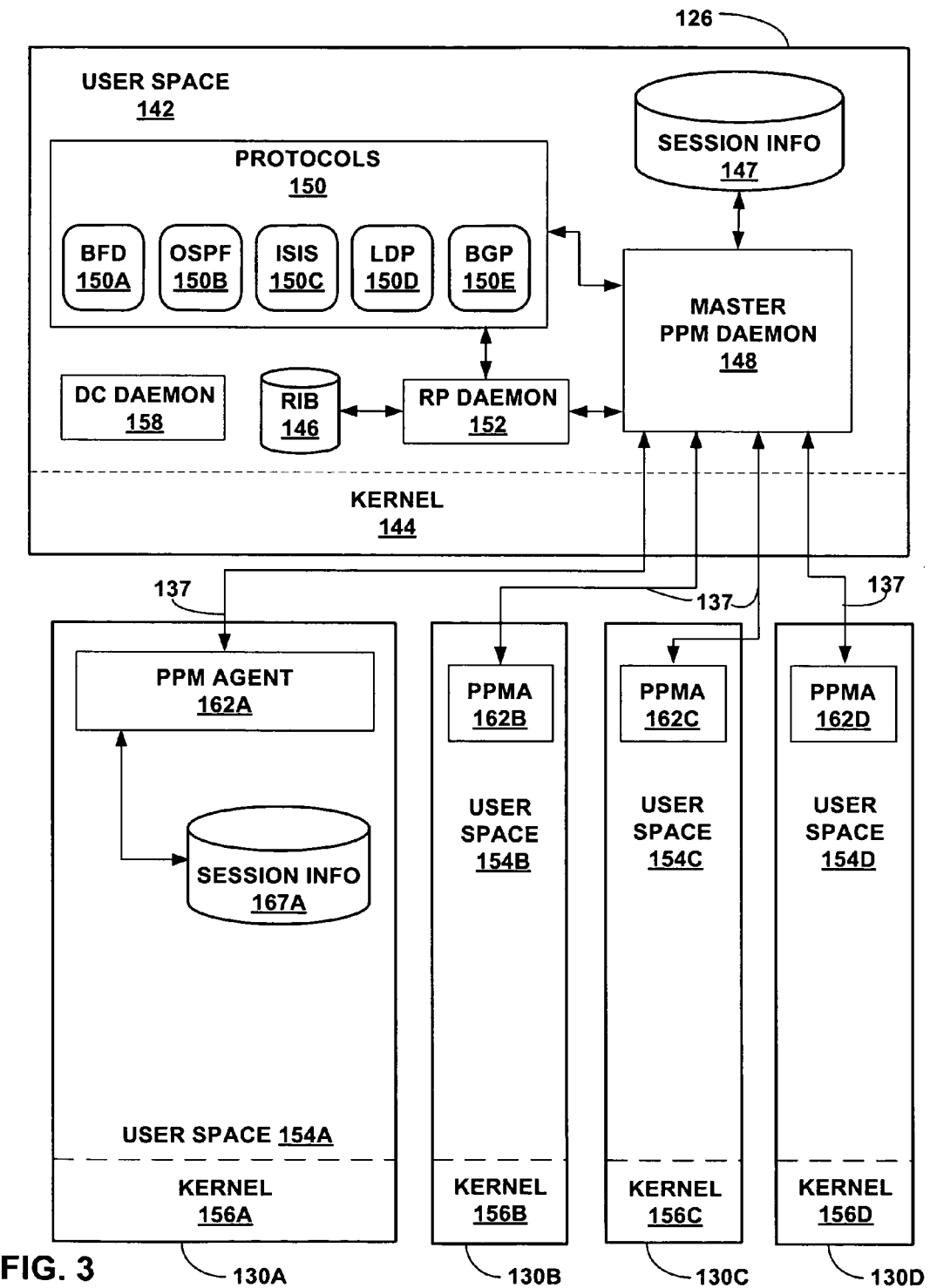
FIG. 3 is a block diagram illustrating an exemplary control plane of the multi-chassis router of FIG. 2 according to an embodiment of the invention.

FIG. 3 is a block diagram illustrating an example embodiment of the control plane of multi-chassis router 120 of FIG. 2 that manages periodic routing protocol communications with peer devices consistent with the principles of the invention. In this example, the control plane includes SCC routing engine 126 connected to four LCC routing engines 130A-130D ("routing engines 130") via dedicated cables 137. In this example, each of LCC routing engines 130 are substantially similar, and for simplicity LCC routing engine 130A is shown in more detail than LCC routing engines 130B-130D. In this embodiment, routing engine 126 operates as the control node of multi-chassis router 120. In other embodiments, a control node, including a user interface for administration of multi-chassis router 120, may be part of one of LCCs 128 or a separate administrative device. Some embodiments may have more than one control node.

SCC routing engine 126 provides an operating environment that includes a user space 142 and a kernel space 144. Kernel space 144 may include an operating system that provides a multi-tasking operating environment for execution of a number of concurrent processes within user space 142. An example of such an operating system is FreeBSD, which is an advanced UNIX operating system that is compatible with a number of programmable processors, including commercially available processors. User space 142 includes software for presenting a master periodic packet management (PPM) daemon 148, a routing protocol (RP) daemon 152 that provides an interface to routing information base (RIB) 146, device configuration (DC) daemon 172B that controls the physical configuration of SCC routing engine 126, and a plurality of protocols 150 that implement specific network routing protocols. In the example of FIG. 3, protocols 150 include BFD 150A, OSPF 150B, IS-IS 150C, LDP 150D, and BGP 150E. In other embodiments, protocols 150 may include additional protocols not shown, and user space 142 may comprise other daemons or software modules.

In general, SCC routing engine 126 controls the operation of LCC routing engines 130. Each of LCC routing engines 130 provide an operating environment for a respective one of kernels 156A-156D ("kernels 156"). To ensure compatibility, kernels 156 may be substantially similar to kernel 144 in SCC routing engine 126. In other embodiments, kernels 156 and kernel 144 may be different types of operating systems or different versions of the same operating system. LCC routing engines 130 further comprise user spaces 154A-154D that provide an operating environment for user-level processes, such as PPM agents 162A-162D ("PPMAs 162"). In this example, routing engine 130A also includes session information 167A. Each of routing engines 130 may include other daemons or software modules, but for simplicity these are only shown on routing engine 130A.

RP daemon 152 of routing engine 126 provides an interface by which complex routing protocols 150 update RIB 146. Although protocols 150 are shown separately, the protocols may be implemented as one or more threads within RP daemon 152. RIB 146 contains route data that describes various routes through the network, and also next hop data indicating appropriate neighboring devices within the network for each of the routes. In response to network topology changes received from protocols 150, RP daemon 152 updates the routing information to accurately reflect the current network topology. RP daemon 152 may communicate with RP daemons 166 to install FIBS 168 within each LCC.

Within master routing engine 126, master PPM daemon 148 is responsible for managing periodic communications with peer routing devices, including outbound and inbound periodic communications that convey operational state of multi-chassis router 120 and the peer devices. In other words, master PPM daemon 148 manages the various time-critical, periodic messages otherwise handled by routing protocols 150, while the routing protocols and RP daemon 152 need only handle the complex routing functions. In this manner, functionality is split between (1) protocols 150 and RP daemon 152 which handle high-level routing functions, and (2) master PPM daemon 148 which manages low-level periodic messages, such as "keep alives" and "hellos, with routing peers. Kernel 144 may execute master PPM daemon 148 as a high priority process, meaning computing resources may be made available for master PPM daemon 148 before any lower priority processes. For example, RP daemon 152 may be using the computing resources of kernel 144. Kernel 144 may transfer the computing resources to master PPM daemon 148 before RP daemon 152 is finished when master PPM daemon 148 has periodic messages that need to be sent. Executing master PPM daemon 148 as a high priority process in a preemptive operating environment may reduce network thrashing, and may allow for quicker detection of legitimate network failures.

In one embodiment, master PPM daemon 148 may include routing protocol-specific plug-ins (not shown). The protocol plug-ins may contain protocol specific information that control periodic communications for respective routing protocols. For example, the protocol plug-ins may contain protocol-specific information and software routines based on the particular format, timing requirements, error handling, messaging sequence and other protocol-specific requirements. As another example, the protocol plug-ins may contain information regarding specific fields within the packet that indicate that the packet is periodic. For instance, the protocol plug-ins may contain information necessary to identify a "hello" field at the beginning of a packet and handle the packet accordingly.

The protocol plug-ins may also contain protocol-specific software routines for determining whether an incoming periodic packet is "equivalent" to previous packets. For example, a protocol may use sequence numbers within a periodic packet communication causing each packet to be slightly different byte-wise. The protocol plug-ins may contain information regarding sequence numbers, and allow master PPM daemon 148 to regard the packet as equivalent to previously received periodic packets. The protocol plug-ins may be installed within master PPM daemon 148 as one or more dynamically linked libraries (DLLs) or other mechanism. When master PPM daemon 148 needs protocol specific information to determine whether a packet is periodic or equivalent, master PPM daemon 148 may access one of the protocol plug-ins.

Master PPM daemon 148 presents an interface that protocols 150 invoke to register and request periodic packet management services. For example, BFD 150A may register with master PPM daemon 148 by issuing a request that includes configuration parameters for BFD-related periodic communications. The request may specify a network adjacency, i.e., a neighboring network device for which BFD 150 would like to be informed of changes in operational state for a given routing protocol. For example, the configuration parameters may specify the Internet Protocol (IP) address of the neighboring device. The configuration parameters may also specify information such as the type of packets to be exchanged, i.e., the format of a keep-alive packet; a time interval for sending outbound packets; and a timer within which packets should be received from the neighboring device. The configuration parameters may include other protocol-specific information for the periodic packets, such as a sequence number to increment. In some embodiments, RP daemon 152 may include in the request a fully formed outbound periodic packet, and/or a periodic packet to which to compare future incoming packets. In some embodiments, protocols 150 may send the configuration parameters separately as outbound configuration parameters and inbound configuration parameters. For example, outbound configuration parameters may specify a set of network data, e.g., a packet, and respective time intervals at which to send the network data. Inbound configuration parameters may specify a set of periodic time intervals for receiving inbound network data and associated identifiers that identify network sources of the network data.

Master PPM daemon 148 saves the information in the request to session information (SESSION INFO) 147. Session information 147 may comprise one or more data structures arranged as tables, trees, link lists, databases, flat files, and other data structures. In the future, if master PPM daemon 148 detects a change in operational state for the network adjacency, e.g., the neighboring device goes down, master PPM daemon 148 will notify BFD 150A of the change. Master PPM daemon 148 also may install session information 167 on LCCs 128. For example, session information 167A of LCC 128A may be a subset of session information 147 that is specific to the adjacencies for which LCC 128A and LCs 134A are anchor points.

Master PPM daemon 148 running on SCC 122 acts as the central master PPM daemon in communication with a variety of distributed PPM daemon agents. Master PPM daemon 148 is aware of each of the distributed resources it has available, such as PPM agents 162 running on LCCs 128, and PPM agents running on LCs 134 (not shown). In one embodiment, master PPM daemon 148 distributes the responsibilities of performing packet management among the distributed PPM agents on a per-adjacency basis. For example, when a client (i.e., a protocol 150) sends a request to perform periodic packet management for a particular adjacency, master PPM daemon 148 determines which distributed PPM agent will act as an "anchor point" for the adjacency. Master PPM daemon 148 may select a PPM agent of an LCC 128 or a PPM agent of an LC 134 within an LCC 128 to be the anchor point. An anchor point for an adjacency handles the sending and receiving of periodic packets for that adjacency. An anchor point must meet two requirements: the anchor point must be able to both send and receive all packets associated with the adjacency. Master PPM daemon 148 may select the anchor point based on criteria such as which PPM agent is associated with the closest interface on which the periodic packets will be sent out, i.e., which hardware interface that is coupled to the next hop for the periodic packets. The criteria may be specific to the protocol and the type of adjacency. However, sometimes master PPM daemon 148 cannot determine which interface is the closest; in this case, master PPM daemon 148 may apply heuristics to select the anchor point.

When master PPM daemon 148 selects the anchor point for an adjacency, master PPM daemon 148 also installs a "long route" for the adjacency within RIB 146. Master PPM daemon 148 may directly install the long route via RP daemon 152. The long routes may be stored in RIB 146 and pushed down to FIBs on each LC 134. When an LC of an LCC receives a periodic packet associated with an adjacency for which the LC/LCC is not the anchor point, the LC forwards the packet to the anchor point LC/LCC along a path through multi-chassis router 120 according to the long route.

If a PPM agent fails, master PPM daemon 148 may mark as "down" all of the adjacencies for which the failed PPM agent is an anchor point. Master PPM daemon 148 may also notify each of the client routing protocols 150 for the adjacencies that have dropped. After master PPM daemon 148 has restarted, the clients may reregister their adjacencies.

Figure 4:
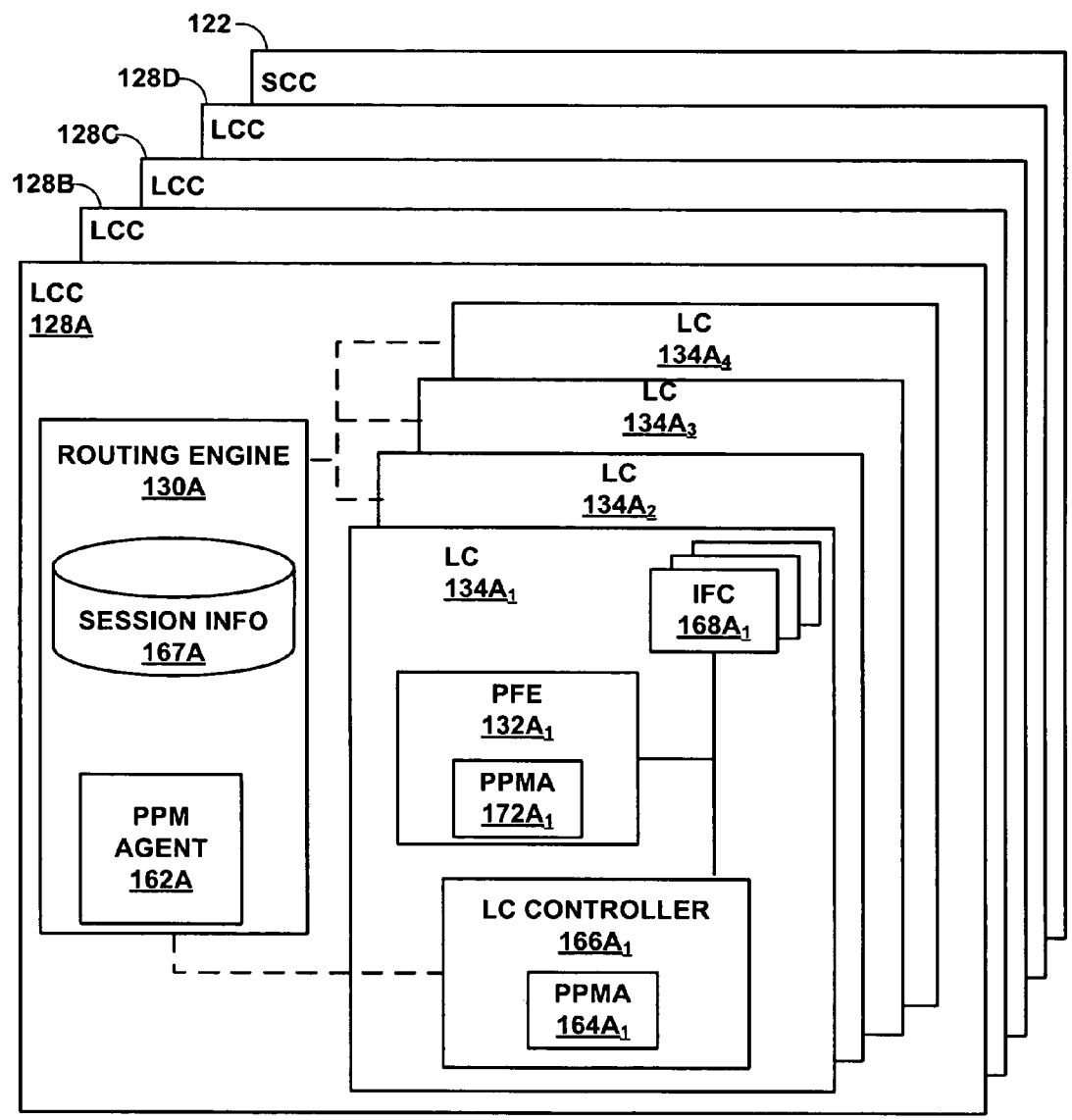
FIG. 4 is a block diagram illustrating in further detail an exemplary line card chassis having a routing engine and a plurality of line cards.

FIG. 4 is a block diagram illustrating in further detail an exemplary LCC 128A of multi-chassis router 120 in which the management of periodic communications is distributed across various cooperative routing components. LCC 128A includes a routing engine 130A (described in FIG. 3), and each LC 134A within LCC 128A includes a packet forwarding engine (PFE) 132. Management of periodic messages may be distributed across routing engine 130A, packet forwarding engine 132A and interface cards (IFCs) $168A_1$-$168A_N$ ("IFCs 168A"). PFE 132A may include PPM agent $172A_1$ that, like PPM agent 162A of FIG. 3, is responsible for managing a portion of the periodic communications with neighboring devices.

Each LC 134A further comprises a set of IFCs $168A_1$ for receiving and sending packets. LCs 134A also include an LC controller $166A_1$ that performs control functions specific to the media type of LC 134A. LC controller $166A_1$ may further implement a PPM agent $164A_1$. PPM agents $164A_1$, $172A_1$, and 162A manage inbound and outbound periodic communication sessions with neighboring devices of multi-chassis router 120, e.g., edge routers 5 (FIG. 1). PPM agent $164A_1$ may, for example, send a packet to edge router 5A according to a periodic time interval. Managing periodic communications with distributed PPM agents may reduce the response time of multi-chassis router 120 to periodic packets, which may increase the number of simultaneous periodic communication sessions that multi-chassis router 120 may perform.

Furthermore, PPM agents may prevent multi-chassis router 120 from thrashing, thereby preventing significant network delays.

When PPM agent 164A₁ of LC controller 166A₁ receives an inbound periodic packet from a neighboring device for which LC controller 166A₁ is not responsible for managing communications with, LC controller 166A₁ relays the packet to PPM agent 172A₁ of packet forwarding engine 132A₁. If PPM agent 172A₁ is not the anchor point for the adjacency associated with the packet, PFE 132A₁ may forward the packet to the appropriate LC according to a long route stored in a FIB (not shown).

Distributing the PPM daemons among the LCCs 128 and among various components within each LCC 128 may reduce the time periods of a response from multi-chassis router 120. Distributing the PPM daemons may also prevent a bottleneck of routing engine 126 of SCC 122 (FIG. 2). Furthermore, multi-chassis router 120 may hold a larger number of conversations with neighboring devices.

Figure 5:
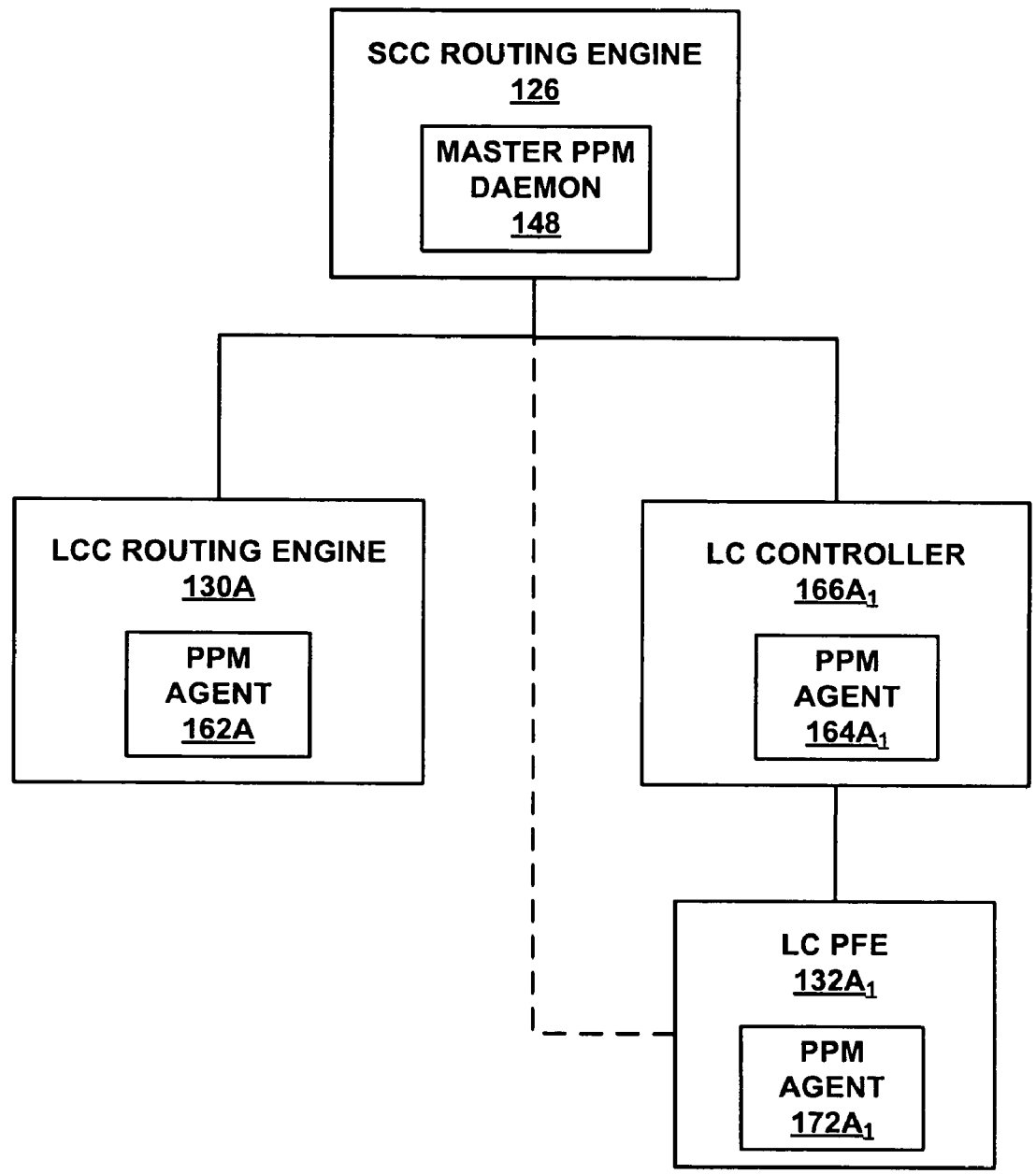
FIG. 5 is a block diagram illustrating a logical representation of the interconnection and communication between a master PPM and the PPM agents within multi-chassis router 120.

FIG. 5 is a block diagram illustrating a logical representation of the interconnection and communication between a master PPM and the PPM agents within multi-chassis router 120. As shown in FIG. 5, SCC routing engine 126, LCC routing engine 130A of LCC 128A, and LC controller 166A₁ of LC 134A₁ within LCC 128A, and LC PFE 132A₁ of LC 134A₁ within LCC 128A are interconnected so as to directly communicate with each other. For example, all of the components may be connected by an Ethernet network internal to the multi-chassis router. As a result, when allocating responsibility for network adjacencies among the distributed PPM agents, master PPM daemon 148 may communicate directly with PPM agent 172A₁, as well as PPM agent 162A and PPM agent 164A₁.

FIG. 6 is a block diagram illustrating an exemplary session information data structure 147 maintained by master PPM daemon 148 of SCC 122 to manage periodic communications with neighboring routers. In the embodiment illustrated in FIG. 6, session information 147 is a table in which each row represents a periodic communication session, i.e., network adjacency, that master PPM daemon 148 may manage. For each communication session, session information 147 may include an identifier of the peer device to be monitored. The identifier may be, for example, an IP address or Media Access Control (MAC) address. Session information may also include the protocol type of the periodic packets, a periodic time interval, and a timer.

For example, master PPM daemon 148 may cause an outbound packet to be sent every 10 seconds according to the period. As another example, master PPM daemon 148 may begin a timer for the communication session with the neighboring device with IP address 145.25.3.154. Master PPM daemon 148 may monitor for incoming periodic packets from the neighboring device with IP address 145.25.3.154, as will be described in further detail below. Each timer may keep track of a time interval for a periodic communication session. Alternatively, one of the timers may keep track of time intervals for multiple periodic communication sessions. When one of the timers expires, master PPM daemon 148 may either send a periodic packet to neighboring devices if the timer is timing an outbound communication session, or notify RP daemon 152 that master PPM daemon 148 did not receive an expected periodic packet if the timer is timing an inbound communication session.

The data of FIG. 6 is illustrated for exemplary purposes, and may be readily varied. For example, session information 147 may further include a fully formed outbound periodic packet, a periodic packet to compare future incoming periodic packets to, multiple periodic packets to compare future incoming periodic packets to, protocol specific information, and the like. Although shown for exemplary purposes as a single data structure, in some embodiments session information 147 may be formed as a plurality of data structures. For example, session information 147 may be organized as separate data structures for outbound periodic communications and inbound periodic communications.

Master PPM daemon 148 may also store a previous packet data structure that stores copies of previously received inbound periodic packets for equivalency comparison of later received periodic packets. For example, the previous packet data structure may store the last periodic packet received for each communication session. Master PPM daemon 148 may create one previous packet data structure for all communication sessions. Alternatively, master PPM daemon 148 may create a separate previous packet data structure for each communication session. Furthermore, the information contained in previous packet data structure may, instead, be incorporated into session information 147. The previous packet data structure may store a copy of incoming periodic packets for each source router identified by the configuration parameters.

Figure 7:
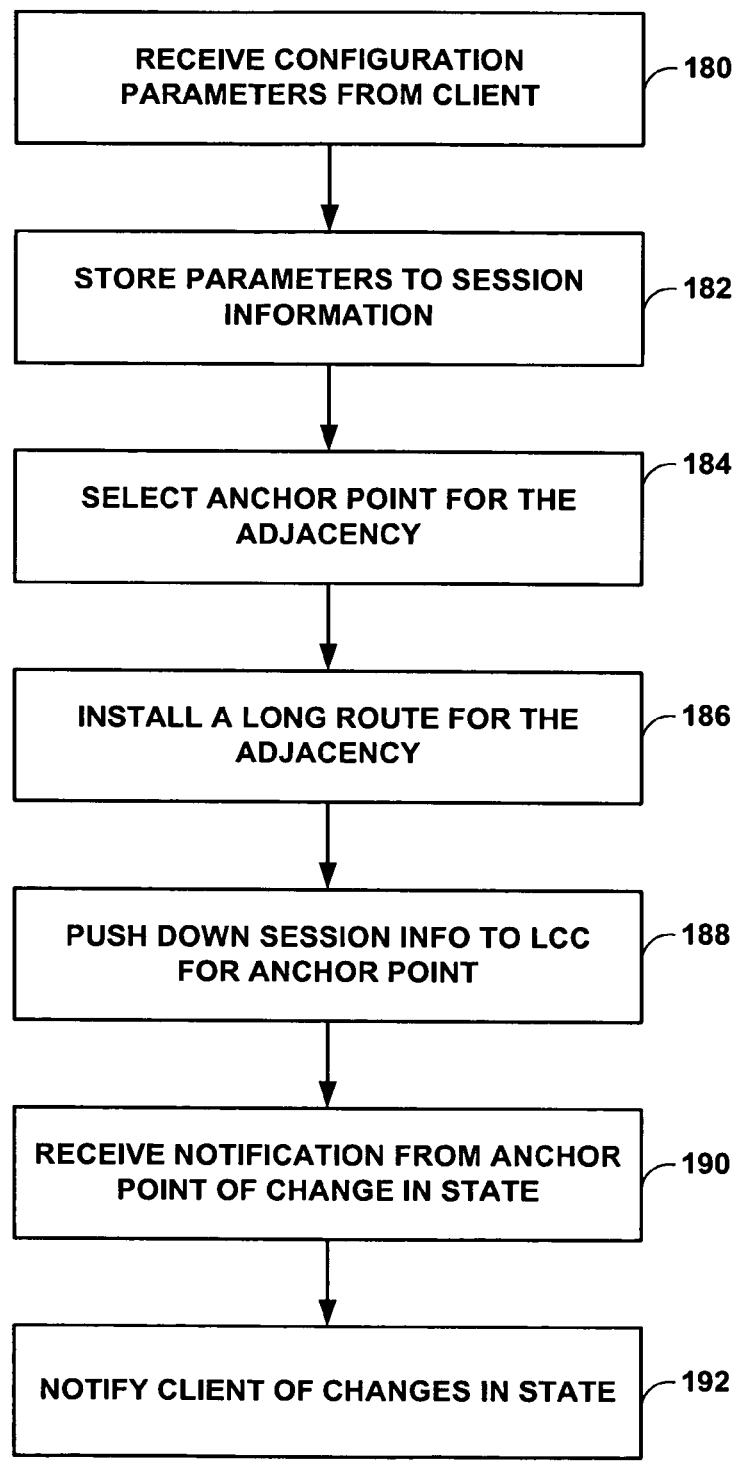
FIG. 7 is a flowchart illustrating exemplary operation of a central periodic packet management daemon running on a switch card chassis in managing periodic communications with neighboring devices.

FIG. 7 is a flowchart illustrating exemplary operation of the master PPM daemon 148 running on SCC 122 in managing periodic communications with neighboring devices. Initially, master PPM daemon 148 receives a request and configuration parameters from a client routing protocol 150 executing within an operating environment provided by SCC 122. For example, master PPM daemon 148 may receive a request to manage periodic communications from BFD protocol 150A (180). The request may include configuration parameters that specify one or more particular adjacencies (i.e., sessions) to be monitored, and may include protocol specific information relating to sending and receiving periodic packets, as described above. Alternatively, the protocol-specific information and control logic may be provided by way of a software plug-in installed within master PPM daemon 148. In either case, master PPM daemon 148 stores the received parameters to session information data structure 147 (182).

Master PPM daemon 148 allocates the responsibilities of performing packet management among the distributed PPM agents, and may allocate the responsibilities on a per-adjacency basis. Master PPM daemon 148 selects an anchor point for each adjacency from among the available PPM agent resources distributed to the routing components of multi-chassis router 120 (184). For example, master PPM daemon 148 may select a PPM agent of a routing engine 130 of an LCC 128 as the anchor point. As another example, master PPM daemon 148 may select a PPM agent of an LC 134. Master PPM daemon 148 may select the anchor point based on criteria such as which PPM agent is associated with the closest interface on which the periodic packets will need to go out, or by applying heuristics to select the anchor point. In some embodiments, master PPM daemon 148 may assign itself as an anchor point for an adjacency. More typically, however, master PPM daemon 148 on the master routing component acts primarily to allocate the adjacencies among the distributed PPM agent resources of multi-chassis router 120.

Upon selecting the anchor point, master PPM daemon 148 also installs a "long route" for the adjacency within RIB 146 (186). The long routes are pushed down to FIBs within each LCC 128 as the FIBs are updated in accordance with RIB 146. Master PPM daemon 148 also sends down to each LCCs 128 subsets of session information 147 that is specific to each LCC 128 (188).

Master PPM daemon 148 may receive a notification from an anchor point PPM agent of a change in state associated with a particular network adjacency (190). For example, a timer may have expired without the anchor point having received a periodic packet from a neighboring device. Master PPM daemon 148 notifies the appropriate client protocol of the change in state of the neighboring device (192). RP daemon 152 may update the topology of the network to reflect the change in state, and accordingly recalculate the routing information.

Figure 8:
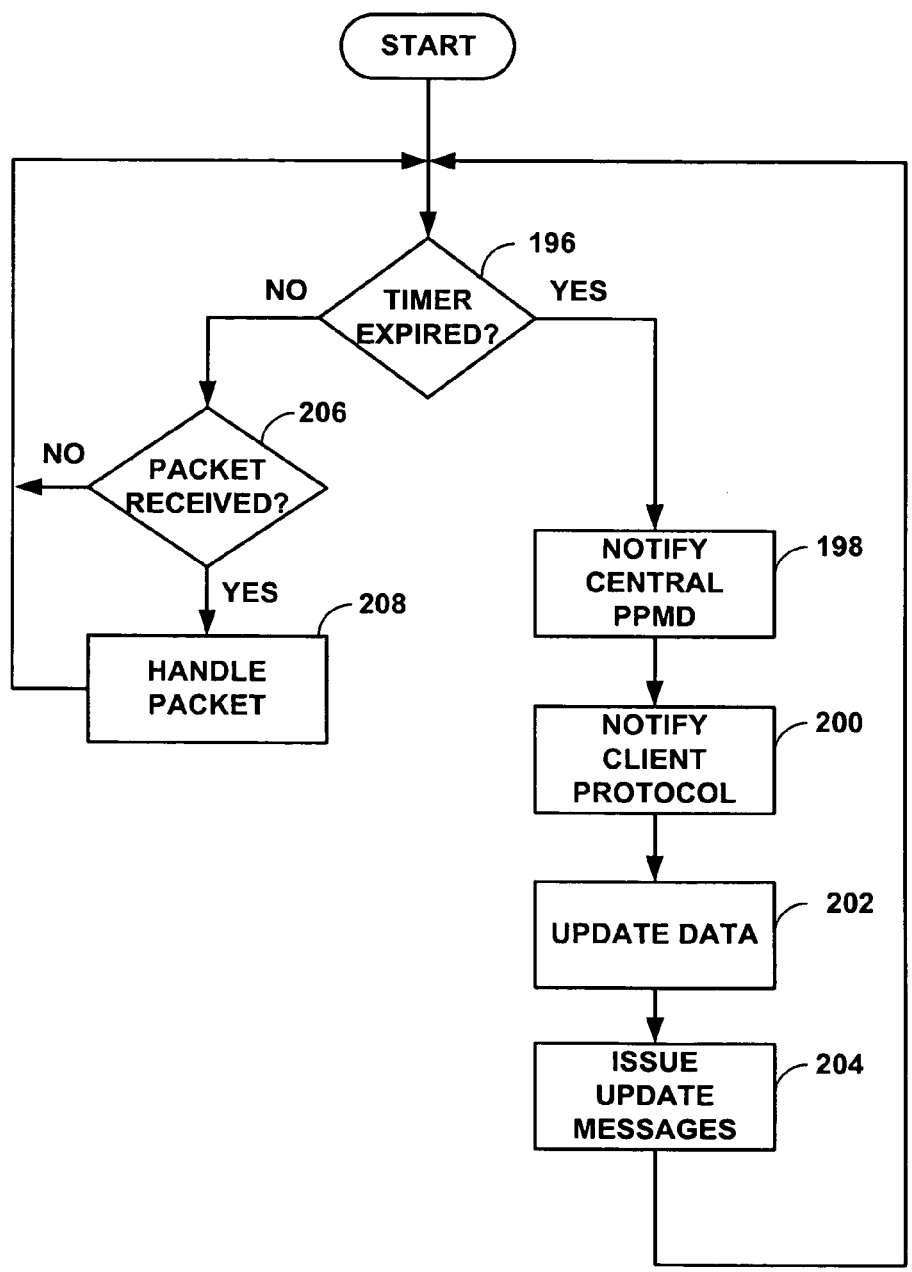
FIG. 8 is a flowchart illustrating an exemplary mode of operation of a multi-chassis router when managing inbound periodic communications in accordance with the principles of the invention.

FIG. 8 is a flowchart illustrating an exemplary mode of operation of multi-chassis router 120 when managing inbound periodic communications in accordance with the principles of the invention. A PPM agent $164A_1$ on one of LCs 134A (FIG. 4) monitors an inbound timer to see whether the timer has expired (196). If the inbound timer expires prior to receipt of an inbound packet associated with the timer, the PPM agent $164A_1$ notifies PPM agent $172A_1$ that PPM agent $164A_1$ did not receive an expected packet from a neighboring device. PPM agent $172A_1$ may in turn notify PPM agent 162A on RE 130A, which notifies master PPM daemon 148 in the central node (198). Ultimately, master PPM daemon 148 relays the information to the appropriate client routing protocol executing within the central node, e.g., BFD 150A, that PPM agent $164A_1$ did not receive an expected packet from a neighboring device for that particular protocol (200). For example, master PPM daemon 148 may send an indication to BFD 150A that indicates a device identifier, such as an IP address or MAC address, and failure message. Master PPM daemon 148 may also notify RP daemon 152. RP daemon 152 may assume the neighboring device is unroutable, i.e. a packet must be sent via a new route if the route path includes the neighboring device that failed. A network device may become unroutable if a link has failed, the device has failed, or other network event has occurred to prevent or limit communication. RP daemon 152 may update the routing data to reflect the unavailability of routes through the device (202). Multi-chassis router 120 may proceed to broadcast update messages to neighboring router devices to indicate the failure of the routes including the neighboring device (204).

In parallel with monitoring the timer, the PPM agent to which responsibility for the adjacency has been allocated (PPM agent $164A_1$ of LC $134A_1$ in this example) monitors for inbound packets (206). When PPM agent $164A_1$ receives an inbound packet, the PPM agent $164A_1$ processes the inbound packet by taking appropriate action (208), such as resetting the expiration timer for the particular adjacency. PPM agent $164A_1$ may handle periodic and non-periodic packets differently, as described below.

Figure 9:
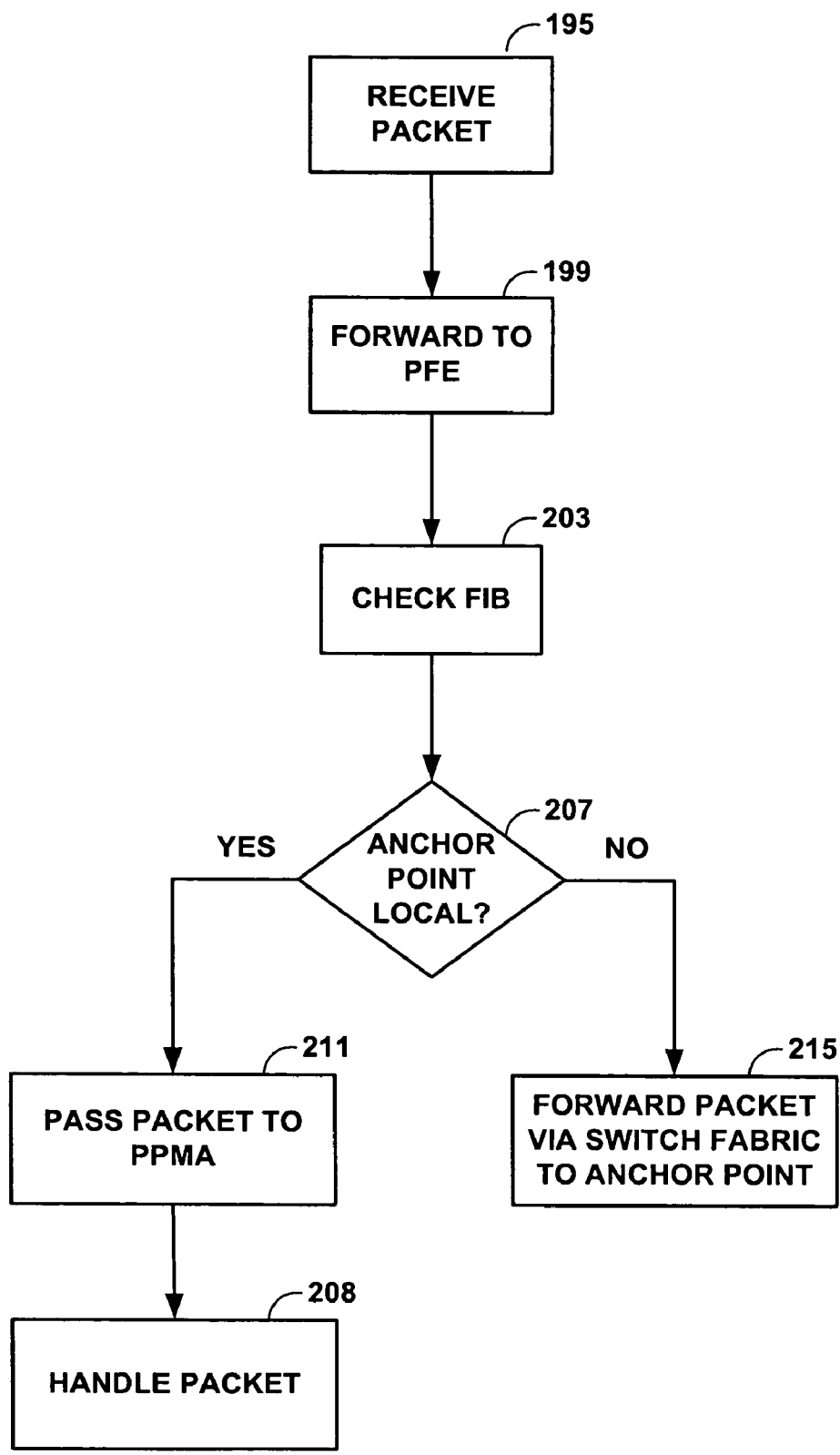
FIG. 9 is a flowchart illustrating exemplary operation of a multi-chassis router in forwarding a received packet to a PPM agent that is an anchor point for a network adjacency with which the packet is associated.

FIG. 9 is a flowchart illustrating exemplary operation of multi-chassis router 120 in forwarding a received packet to the appropriate PPM agent that is designated as the anchor point for a network adjacency with which the packet is associated. When multi-chassis router 120 receives a packet on an IFC 168 of an LC 134 (195), the IFC 168 forwards the packet to the PFE 132 of the LC 134 (199). The PFE 132 checks its FIB (203) to determine whether the anchor point for the adjacency associated with the packet is local (i.e., on that LC 134) (207). If the anchor point is local, the PFE 132 passes the packet to the appropriate PPM agent on the LC 134 (211), which handles the packet (208). If the anchor point is not local, the PFE 132 forwards the packet to the correct anchor point using the switch fabric in accordance with routing information installed within the forwarding information base (215). There, the PFE of the anchor point LC 134 will determine that the anchor point is local and pass the packet to the appropriate PPM agent.

Figure 10:
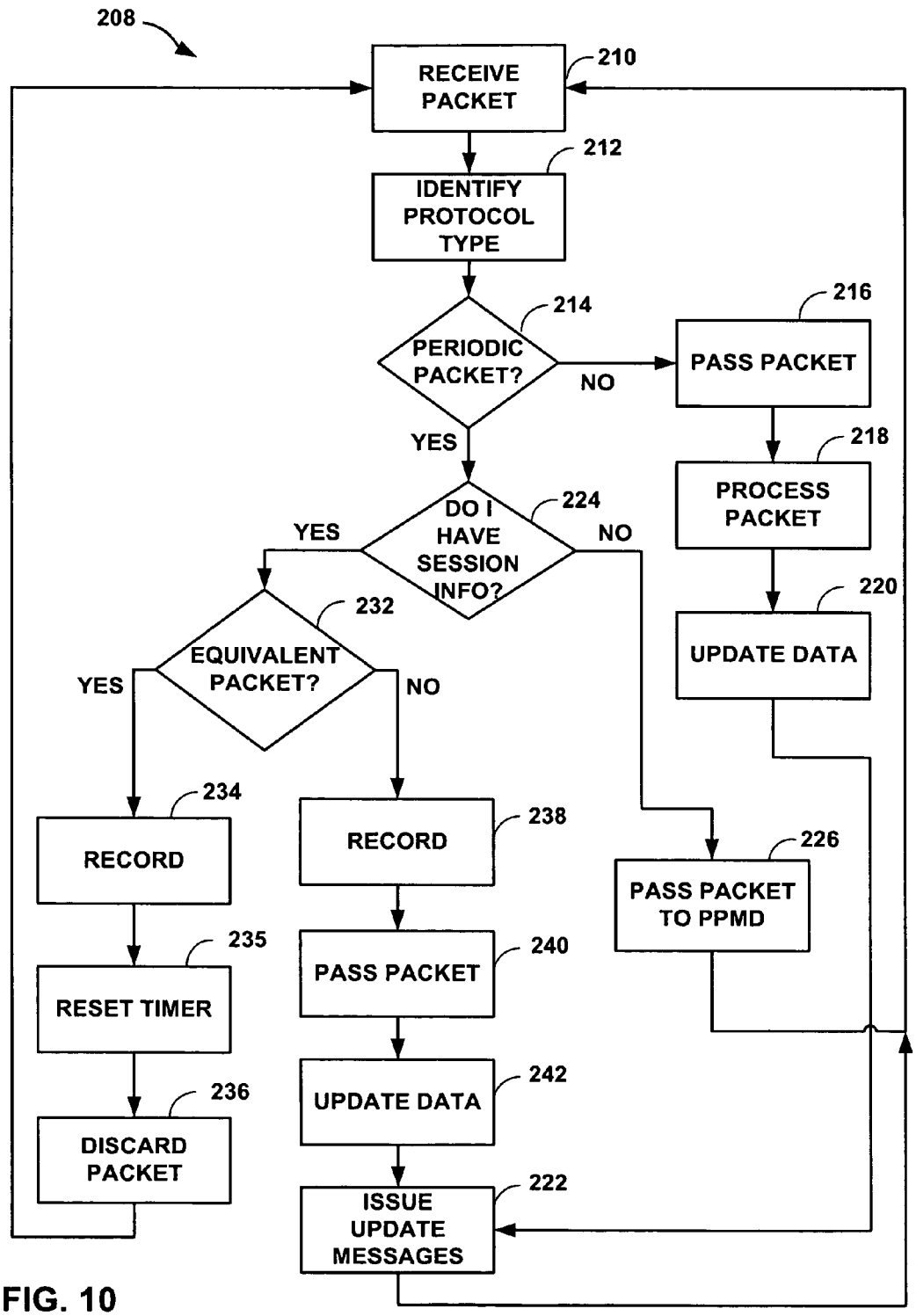
FIG. 10 is a flowchart illustrating exemplary operation of a line card of a line card chassis of a multi-chassis router when managing inbound periodic messages in accordance with the principles of the invention.
Figure 11:
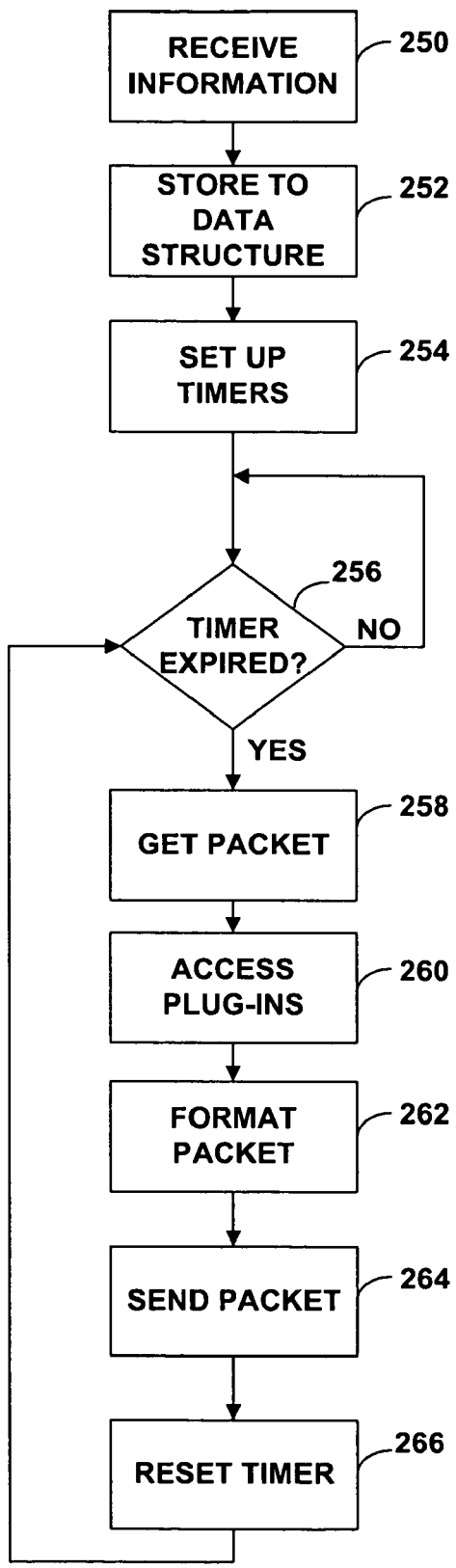
FIG. 11 is a flowchart illustrating an exemplary mode of operation of a multi-chassis router when managing outbound periodic communications in accordance with the principles of the invention.

FIG. 10 is a flowchart illustrating exemplary operation of an LC 134 of an LCC 128 of multi-chassis router 120 when managing inbound periodic messages in accordance with the principles of the invention. In particular, FIG. 10 illustrates example operation of a PPM agent in handling a packet in further detail, i.e., step 208 of FIGS. 8 and 9. A PPM agent $164A_1$ on an LC 134A receives an inbound packet from a neighboring network device (210). PPM agent $164A_1$ may identify the protocol type of the packet (212). Using protocol specific information from one of its protocol plug-ins, PPM agent $164A_1$ may determine whether the inbound packet is "periodic" (214). The term "periodic packet" and "periodic communication" in this context refers to a packet or collection of packets used for indicating the operational state of a network device with respect to a particular routing protocol, as opposed to a packet used to convey routing information (e.g., topology information) for that routing protocol. For instance, the routing protocol plug-in may contain information and logic in the form of software routines such that PPM agent $164A_1$ is capable of determining the type of message, such as a hello or a keepalive, by checking one or more fields within the packet. Alternatively, PPM agent $164A_1$ may do a byte-wise comparison of the packet with the previous incoming packets stored in session information 167A. If the incoming packet matches previous packets, PPM agent $164A_1$ may regard the packet as a periodic packet and handle the packet accordingly.

When the packet is not a periodic communication, PPM agent $164A_1$ passes the packet up to RP daemon 152 of the central node (216). RP daemon 152 may process the packet and update routing information, routing protocol data or the like (218, 220). If necessary, RP daemon 152 may broadcast update messages that indicate to neighboring devices changes in the network topology (222). For example, multi-chassis router 120 may have received a Border Gateway Protocol (BGP) packet that contains updated routing information for the BGP protocol.

When the packet is determined to be a periodic communication, PPM agent $164A_1$ determines whether PPM agent $164A_1$ has session information for the adjacency associated with the packet (224). PPM agent $164A_1$ will have session information if PPM agent $164A_1$ is the anchor point. Since the PFE 132 is programmed to send the packet to the anchor point (FIG. 9), typically PPM agent $164A_1$ will have the session information, so step (224) acts as an error check. PPM agent $164A_1$ may determine this by comparing information contained within the packet to session information 167A. If PPM agent $164A_1$ is not the anchor point for the packet, PPM agent $164A_1$ passes the packet up to master PPM daemon (226).

If PPM agent $164A_1$ is the anchor point for the packet, PPM agent $164A_1$ determines whether the periodic packet is equivalent to previously received periodic packets (232). To determine whether a packet is equivalent to previous packets, PPM agent $164A_1$ may do a byte-wise comparison of the packet to a previously received periodic packet stored in session information 167A. Session information 167A may store a copy of previously received inbound periodic packets for equivalency comparison of later received periodic packets. For example, session information 167A may store the last periodic packet received for each communication session. PPM agent $164A_1$ may maintain a separate periodic packet data structure within session information 167A for each source address of a neighboring device.

When the periodic packet is equivalent to previously received periodic packets, PPM agent $164A_1$ makes a record of receiving the packet (234), for example by making a record of receiving the packet by copying the contents of the packet into session information 167A for future comparisons. PPM agent 164A₁ may reset the corresponding timer to begin tracking the amount of time that elapses since receiving the last incoming packet (235). PPM agent 164A₁ then discards the packet (236).

When the periodic packet is not equivalent to previously received periodic packets, PPM agent 164A₁ makes a record of receiving the periodic packet, and then communicates the packet to RP daemon 152 (238, 240). Again, PPM agent 164A₁ may copy the contents of the packet into session information 167A for future comparisons, and reset the corresponding timer. RP daemon 152 may update routing data, RP information, or the like (242). Furthermore, RP daemon 152 may broadcast update messages that indicate changes in network topology (222). Where the LC 134 does not have a PPM agent 164A₁ installed on LC controller 166A₁, LC controller 166A₁ passes the packet to PPM daemon 172A₁, which then performs the above steps instead of PPM agent 164A₁.

FIG. 10 is a flowchart illustrating an exemplary mode of operation of multi-chassis router 120 when managing outbound periodic communications in accordance with the principles of the invention. Initially, master PPM daemon 148 receives registration requests and outbound configuration parameters from client routing protocols 150 (250). Master PPM daemon 148 stores the parameters to session information data structure 147 (252), selects the appropriate anchor points, and pushes an appropriate subset of the session information down to LCC 128A, for example.

In response, the selected ones of PPM agents 162A, 172A, and 164A store the session information and proceed to set up outbound timers for the sessions (254). One timer may be set up for each of the periodic communication sessions. As mentioned before, one of the timers may keep track of more than one communication session. For example, if two of the outbound communication sessions have equivalent periodic time intervals, one timer may track the time since the last periodic packet was sent for both of the communication sessions simultaneously. The distributed PPM agents frequently check the timers to see whether any of the timers has expired (256).

When one or more of the outbound timers expires, the appropriate PPM agent may retrieve the corresponding packet from session information 167A or otherwise format the particular outbound packet to be sent (258). The PPM agent may access the appropriate protocol plug-in to format the packet, if necessary (260, 262). For example, the PPM dae agent mon may invoke the appropriate protocol plug-in to format the periodic packet in accordance with the standards associated with the corresponding routing protocol. The PPM agent sends the packet out to the appropriate peer network device, and resets the outbound timer (264, 266).

Various embodiments of the invention have been described. Nevertheless, it will be understood that various modifications may be made without departing from the principles of the invention. For example, although the embodiments herein have been described as packet-based, any data type may be used without departing from the periodic processing systems and methods described herein. As another example, a multi-chassis router may or may not include a central switch fabric, and could using switch fabric in one or more LCCs to provide connections between the multiple devices of a multi-chassis router. Such a router may or may not include a centralized control node; e.g., LCCs may share control functions in a multi-chassis router. In one instance, two chassis may be coupled to operate as a single router, with each chassis including network interfaces. These and other embodiments are within the scope of the following claims.

The invention claimed is:

1. A method comprising:
performing network routing operations for a set of routing protocols with a multi-chassis router having a plurality of hierarchically arranged routing components operating as a single node within a network;
receiving a request from one of the set of routing protocols to perform periodic communications with a peer network router within the network, wherein the periodic communications verify that the peer network router is operational with respect to the requesting one of the set of routing protocols;
allocating responsibility for performing periodic communications for the set of routing protocols to the plurality of hierarchically arranged routing components, wherein allocating responsibility for performing periodic communications comprises selecting a first one of the plurality of hierarchically arranged routing components of the multi-chassis router to perform the periodic communications with the peer network router;
prior to performing periodic communications with the peer network router, updating routing information within the multi-chassis router to install a route for the periodic communications with the peer network router, wherein the route specifies a path within the multi-chassis router from a second one of the routing components of the multi-chassis router that receives the periodic communications sent by the peer network router to the first one of the routing components of the multi-chassis router to which responsibility for performing the periodic communications has been allocated;
issuing, with the first one of the routing components of the multi-chassis router via a first interface of the multi-chassis router, a request to the peer network router for a responsive periodic communication; and
receiving a periodic communication from the peer network router at the second one of the routing components via a second interface of the multi-chassis router, wherein the periodic communication received at the second one of the routing components is responsive to the request for the responsive periodic communication issued by the first one of the routing components.

2. The method of claim 1, wherein selecting the first routing component comprises selecting a first routing component that is able to issue and receive communications associated with the peer network router.

3. The method of claim 1, further comprising:
forwarding the periodic communication from the second one of the routing components of the multi-chassis router to the selected first one of the routing components along the path within the multi-chassis router according to the route when the second routing component is not the selected routing component.

4. The method of claim 1, further comprising:
receiving data from a network;
determining whether the data: (1) indicates whether a network device is operational with respect to a routing protocol, or (2) conveys routing information for the routing protocol;
processing the data with a master one of the routing components when the data conveys routing information; and
processing the data with one or more slave routing components in accordance with the allocated responsibility for performing periodic communications when the data indicates whether the network device is operational with respect to the routing protocol.

5. The method of claim 1, further comprising:
executing a periodic packet management software process that presents an interface for receiving configuration parameters from the routing protocols;
receiving, with the periodic packet management software process, configuration parameters from the routing protocols, wherein the configuration parameters comprise inbound configuration parameters that specify a set of periodic time intervals for receiving inbound periodic communications with the multi-chassis router and associated identifiers that identify network sources of the periodic communications; and
communicating with the peer network router using the periodic communications in accordance with the configuration parameters.

6. The method of claim 5, wherein the configuration parameters comprise outbound configuration parameters that specify a set of periodic communications to be sent by the multi-chassis router to peer network routers and respective time intervals at which to issue the periodic communications.

7. The method of claim 5, further comprising installing one or more protocol-specific plug-in software modules within the periodic packet management software process, wherein the protocol-specific plug-in software modules format the set of periodic communications according to standards associated with the respective routing protocols.

8. The method of claim 1, wherein selecting the first routing component comprises selecting a first routing component that is associated with a hardware interface that is coupled to a next hop for the periodic communication with the peer network router.

9. The method of claim 1, wherein updating routing information within the multi-chassis router to install a route for the periodic communications with the peer network router further comprises:
installing the route into a routing information base for a master one of the routing components, wherein the routing information base comprises route data;
deriving one or more forwarding information bases for one or more slave routing components from the routing information base, wherein the forwarding information bases include the route; and
pushing the one or more forwarding information bases to the respective one or more slave routing components,
wherein the route is a layer 3 route.

10. A router comprising:
a plurality of hierarchically arranged cooperative routing components operating as a single node within a network;
a set of routing protocols executing within operating environments provided by a master one of the routing components, wherein the routing protocols exchange routing information with neighboring routers and update routing data based on the exchanged routing information; and
a set of one or more periodic packet management daemons that communicate with peer routers using periodic communications to verify that the routers are operational with respect to one or more of the routing protocols, wherein the set of one or more periodic packet management daemons is distributed among the hierarchically arranged cooperative routing components,
wherein one of the set of routing protocols issues a request to perform first periodic communications with a first peer network router within the network, wherein the first periodic communications verify that the first peer network router is operational with respect to the requesting one of the set of routing protocols, and wherein a periodic packet management daemon operating on a master one of the routing components selects a first one of the one or more distributed periodic packet management daemons of a first one of the routing components to perform the first periodic communications with the first peer network router,
wherein, prior to performing periodic communications with the first peer network router, the periodic packet management daemon operating on the master one of the routing components installs a first route within routing information maintained by the router for the first periodic communications with the first peer network router, wherein the first route specifies a path within the router from a second one of the routing components of the router that receives the periodic communications sent by the first peer network router to the first selected one of the one or more distributed periodic packet management daemons of the first one of the routing components of the router to which responsibility for the performing the first periodic communications has been allocated,
wherein the selected first one of the distributed periodic packet management daemons of the first one of the routing components issues a request for a responsive periodic communication to the first peer network router via a first interface of the router, and
wherein the second one of the routing components of the router receives a periodic communication from the first peer network router via a second interface of the router, wherein the periodic communication received is responsive to the request for the responsive periodic communication issued by the first one of the distributed periodic packet management daemons of the first one of the routing components.

11. The router of claim 10, further comprising:
a switch card chassis operating the master one of the routing components of the router; and
one or more line card chassis that operate as packet routing devices, wherein each of the line card chassis includes a set of line cards to receive data from the network, and
wherein the set of one or more periodic packet management daemons is distributed among the switch card chassis, the one or more line card chassis, and the line cards.

12. The router of claim 10, wherein the periodic packet management daemons receive configuration information from the set of routing protocols and communicate with neighboring network devices using the periodic communications in accordance with the configuration parameters.

13. The router of claim 10, wherein a routing component receives data from a network, and wherein the periodic packet management daemon associated with the routing component determines whether the data: (1) indicates whether a network device is operational with respect to a routing protocol, or (2) conveys routing information for the routing protocol, wherein the master one of the routing components processes the data when the data conveys routing information, and wherein one or more slave routing components process the data in accordance with allocated responsibility for performing periodic communications when the data indicates whether the network device is operational with respect to the routing protocol.

14. The router of claim 10,
wherein the second routing component forwards the first responsive periodic communication to the selected first one of the distributed periodic packet management daemons along the path within the multi-chassis router according to the first route.

15. The router of claim 14,
wherein the requesting routing protocol issues a request to perform second periodic communications with a second peer network router within the network, and wherein the periodic packet management daemon selects the second one of the one or more distributed periodic packet management daemons of the second one of the routing components to perform the second periodic communications with the second peer network router,
wherein, prior to performing periodic communications with the second peer network router, the periodic packet management daemon installs a second route within routing information maintained by the router for the second periodic communications with the second peer network router, wherein the route specifies a path within the multi-chassis router from the first one of the routing components of the multi-chassis router that receives the periodic communications sent by the second peer network router to the second selected distributed periodic packet management daemon of the second one of the routing components to which responsibility for the performing the second periodic communications has been allocated,
wherein the second selected distributed periodic packet management daemon issues a request for a second responsive periodic communication to the second peer network router,
wherein the first one of the routing components of the multi-chassis router receives the second responsive periodic communication from the second peer network router in response to the request for the second responsive periodic communication, and
wherein the first one of the routing components of the multi-chassis router forwards the second responsive periodic communication to the second selected distributed periodic packet management daemon along the path within the multi-chassis router according to the second route,
wherein the second one of the routing components of the multi-chassis router receives the first responsive periodic communication from the first peer network router via the second peer network router, and
wherein the first one of the routing components of the multi-chassis router receives the second responsive periodic communication from the second peer network router via the first peer network router.

16. A tangible computer-readable medium comprising instructions for causing a programmable processor to:
perform network routing operations for a set of routing protocols with a multi-chassis router having a plurality of hierarchically arranged routing components operating as a single node within a network;
receive a request from one of the set of routing protocols to perform periodic communications with a peer network router within the network, wherein the periodic communications verify that the peer network router is operational with respect to the requesting one of the set of routing protocols;
allocate responsibility for performing periodic communications for the set of routing protocols to the plurality of hierarchically arranged cooperative routing components;
select a first one of the plurality of hierarchically arranged cooperative routing components of the multi-chassis router to perform the periodic communications with the peer network router;
update routing information within the multi-chassis router to install a route for the periodic communications with the peer network router prior to performing periodic communications with the peer network router, wherein the route specifies a path within the multi-chassis router from a second one of the routing components of the multi-chassis router that receives the periodic communications sent by the peer network router to the first one of the routing components of the multi-chassis router to which responsibility for performing the periodic communications has been allocated;
issue, with the first one of the routing components of the multi-chassis router via a first interface of the multi-chassis router, a request to the peer network router for a responsive periodic communication; and
receive a periodic communication from the peer network router at the second one of the routing components via a second interface of the multi-chassis router, wherein the periodic communication received at the second one of the routing components is responsive to the request for the responsive periodic communication issued by the first one of the routing components.

17. The computer-readable medium of claim 16, further comprising instructions to cause the programmable processor to:
receive a periodic communication from the peer network router at the second one of the routing components of the multi-chassis router;
determine whether the second routing component is the selected routing component for performing the period communications with the peer network router; and
forward the periodic communication from the second one of the routing components of the multi-chassis router to the first routing component along the path within the multi-chassis router according to the route when the second routing component is not the selected routing component.

18. The computer-readable medium of claim 16, further comprising instructions to cause the programmable processor to:
receive data from a network;
determine whether the data: (1) indicates whether a network device is operational with respect to a routing protocol, or (2) conveys routing information for the routing protocol;
process the data with a master one of the routing components when the data conveys routing information, and
process the data with one or more slave routing components in accordance with the allocated responsibility for performing periodic communications when the data indicates whether the network device is operational with respect to the routing protocol.

* * * * *